Patented Sept. 11, 1951

2,567,399

UNITED STATES PATENT OFFICE 2,567,399

PURIFYING SULFONIC ACIDS

Wayne A. Proell, Chicago, Ill., assignor to Standard Oil Company, Chicago, Ill., a corporation of Indiana No Drawing. Application October 22, 1946, Serial No. 704,994

12 Claims. (Cl. 260—513)

This invention relates to a process for purifying crude sulfonic acids containing impurities such as nitrogen oxides, sulfur dioxide, disulfoxides and the like. More particularly, it relates to the purification of alkanesulfonic acids containing one or more of the above mentioned impurities, said sulfonic acids being derived from a nitrogen oxide-catalyzed oxidation of alkyl or cycloalkyl mercaptans or compounds having the formula $R_1S_nR_2$ wherein $R_1$ and $R_2$ are aliphatic hydrocarbon radicals, which may be identical.

Alkyl and cycloalkyl mercaptans can be oxidized to the corresponding sulfonic acids by a gas stream containing free oxygen, for example, air, and a small catalytic quantity of a nitrogen oxide selected from the group consisting of NO, $NO_2$, $N_2O_3$, $N_2O_4$ and $N_2O_5$ at temperatures below about 300° F., preferably between about 50° F. and about 120° F., and at pressures between about 5 and about 50 p. s. i. g., as described and claimed in application for Letters Patent Serial No. 718,900 (now Patent No. 2,505,910) filed by Wayne A. Proell and Bernard H. Shoemaker on December 27, 1946, as a continuation in part of Serial No. 571,022 filed on January 1, 1945, now abandoned.

Sulfur compounds having the formula $R_1S_nR_2$ wherein $R_1$ and $R_2$ are hydrocarbon radicals, S is sulfur and $n$ is an integer having a value between 1 and 6, preferably having a value of 2, can be oxidized to sulfonic acids containing more or less intermediate oxidation products, such as disulfoxides, disulfones and sulfonic anhydrides, by a gas stream containing free oxygen and a catalytic quantity of a nitrogen oxide selected from the group consisting of NO, $NO_2$, $N_2O_3$, $N_2O_4$ and $N_2O_5$ at temperatures between about 20° F. and about 250° F., and pressures between about 5 and about 50 p. s. i. g., as described and claimed in application for Letters Patent, Serial No. 571,023, filed by Wayne A. Proell and Bernard H. Shoemaker on January 1, 1945, now U. S. Patent No. 2,433,395. The oxidation can be conducted in two stages to obtain maximum efficiency, the first stage being operated at temperatures between about 20° C. and about 50° C. to produce a reaction mixture containing between about 40 and about 70 per cent of sulfonic acid, and the second stage operated at temperatures between about 70° C. and about 150° C. to yield a product containing at least 90 weight per cent of sulfonic acid, as described and claimed in application for Letters Patent, Serial No. 590,841, filed by Wayne A. Proell on April 28, 1945, now U. S. Patent No. 2,433,396.

It has been found that the sulfonic acids produced by the above processes retain appreciable quantities of the nitrogen oxides employed as the oxidation catalysts. Nitrogen oxide retention in the sulfonic acid product is undesirable, since catalyst losses from the oxidation process appreciably increases its expense. Moreover, it is desirable for most purposes to produce nitrogen-free sulfonic acids. It has also been observed that the sulfonic acids produced by the processes described above contain foul smelling impurities. All the undesirable malodorous impurities have not been isolated and characterized. However, I have observed the presence of sulfur dioxide and of acrid disulfoxides in alkanesulfonic acids produced by the catalytic oxidation of alkyl disulfides in accordance with the process described in U. S. Patent 2,433,395.

In order to increase the commercial utility and salability of the sulfonic acids produced by the above described processes, it is, therefore, necessary to subject them to a purification treatment to remove catalyst and malodorous impurities.

It was thought that the problem of removing nitrogen oxides from crude alkanesulfonic acids could be solved simply by heating the acids and simultaneously passing a stripping gas such as air, nitrogen, or carbon dioxide therethrough. An experimental study of this procedure revealed that the ease of removal of nitrogen oxides from crude sulfonic acids by stripping depends to a large extent on the concentration of the sulfonic acid in the crude oxidation product; the higher the acid strength the more difficult it was to remove nitrogen oxides therefrom by stripping and heating. Dilution of the crude oxidation products with water to reduce the acid strength is, however, extremely undesirable, even though such dilution would aid in the removal of nitrogen oxides from the product. One of the outstanding advantages of the above described processes for the production of sulfonic acids is that it is possible directly to produce high strength, substantially anhydrous sulfonic acids thereby.

Furthermore, it has been observed that it is usually necessary to heat crude sulfonic acids to temperatures between about 230° F. and about 260° F. in order to remove nitrogen oxides therefrom within a reasonable period of time varying from about 10 minutes to about 1½ hours. In the employment of the heating and stripping procedure it has also been observed that substantial proportions of nitrogen oxides are very tenaciously retained in the crude sulfonic acids. In addition, it has been noted that some batches of sulfonic acids, produced by the processes mentioned above, on standing undergo some process which binds nitrogen oxides so that blowing with a stripping gas such as air at temperatures between 180° F. and 260° F. fails to remove nitrogen oxides. As an example, a sample of methanesulfonic acid produced by the oxidation of dimethyl disulfide in the presence of $NO_2$ and containing about 5 per cent by weight of $NO_2$ was blown with air for several hours at 260° F. and lost only a trace of $NO_2$. It was also observed that the removal of nitrogen oxides from crude sulfonic acids by heating and stripping was followed very rapidly by darkening of the sulfonic acid product.

The possibilities of electrolytically removing nitrogen oxides from crude sulfonic acids produced by the above described processes were then investigated. Upon subjecting crude alkanesulfonic acid solutions to electrolysis with direct or alternating electric current, it was found that nitrogen oxide removal could be accomplished but that a portion of the sulfonic acid in the crude reaction product was oxidized simultaneously to sulfuric acid. For some applications it is desirable to produce sulfonic acids of low sulfate content and the electrolytic purification procedure is, therefore, not generally applicable.

It is an object of this invention to provide a process for purifying sulfonic acids containing impurities such as nitrogen oxides, sulfur dioxide and intermediate oxidation products such as disulfoxides. Another object of my invention is to provide a process for removing nitrogen oxides, such as nitrogen dioxide, and malodorous impurities from alkanesulfonic acids, particularly from alkanesulfonic acids containing between 1 and 5 carbon atoms in the alkyl group. An additional object of my invention is to provide a process for the elimination of nitrogen oxides and malodorous impurities from crude alkanesulfonic acids produced by the oxidation of mercaptans or sulfides with a gas containing free oxygen and a catalytic quantity of a nitrogen oxide selected from the group consisting of NO, $NO_2$, $N_2O_3$, $N_2O_4$ and $N_2O_5$. These and other objects of my invention will become apparent from the ensuing description thereof.

In accordance with this invention the crude sulfonic acid, particularly an alkanesulfonic acid, containing one or more impurities such as nitrogen oxides, sulfur dioxide, and malodorous intermediate oxidation products, e. g., disulfoxides, is contacted in the liquid phase with a small quantity of nitric acid sufficient to interact with the impurities. The crude sulfonic acids produced by the processes of U. S. Patents 2,433,395-6 (supra) usually do not contain more than about 5 per cent by weight of impurities such as nitrogen oxides, sulfur dioxide, and malodorous intermediate oxidation products. I prefer to use nitric acid having a concentration between about 60 and about 100 per cent by weight; ordinarily between about 1 and about 5 per cent by weight of nitric acid having the above-mentioned concentration range is sufficient to interact with a substantial proportion of the impurities in the crude sulfonic acid, although at times it may be desirable to use larger quantities of nitric acid, for example, up to 10 or even 15 per cent by weight based on the weight of the crude sulfonic acid.

Contacting of the crude sulfonic acid with the nitric acid is usually effected at ambient temperatures, but in general temperatures between about 0° F. and about 75° F. can be employed. In general, I prefer to employ temperatures between about 32° F. and about 75° F. The contacting of the crude sulfonic acid with nitric acid can be effected in a single stage or in multiple stages. Countercurrent or concurrent flow contacting, as employed in the extraction of hydrocarbon oils with selective solvents, may be employed.

The duration of the contacting operation can vary from about one second to several hours or more. Following the contacting operation, impurities including excess nitric acid are volatilized from the treated sulfonic acid. Conventional methods of removing volatile impurities from liquid materials may be employed. I have successfully employed the method of removing volatile impurities comprising heating the treated sulfonic acid and purging with an inert gas. Specifically, I have found that, following the contacting of crude sulfonic acid with nitric acid, volatile impurities may be removed from the treated sulfonic acid by blowing air through the same at a temperature which may suitably fall between about 180° F. and about 280° F., during a sufficient period of time, usually between about 1 and about 10 hours. Other inert gases, e. g., $CO_2$, nitrogen, flue gases and the like may be employed in the purging operation. A combination of heat and suction may be applied to the treated sulfonic acid to remove volatile impurities.

Nitric acid treatment of crude sulfonic acids containing impurities such as those described above results in substantial improvement in color and odor, reduction in the content of nitrogen oxides such as nitrogen dioxide and appreciable reduction of the sulfur dioxide content of the crude sulfonic acid, without entailing appreciable increases in the sulfuric acid concentration of the crude sulfonic acid. Nitric acid seems to be unique in its ability to effect the purification described above. An attempt to purify crude alkanesulfonic acids containing between 1 and 5 carbon atoms, inclusive, in the molecule and comprising nitrogen dioxide and malodorous intermediate oxidation products such as disulfoxides, by contacting with hydrogen chloride gas resulted in darkening of the crude acid and in accentuation of its foul odor. When crude alkanesulfonic acids of between 1 and 5 carbon atoms, inclusive, in the molecule, containing nitrogen dioxide, etc. are treated with nitric acid and, before complete removal of excess nitric acid, with hydrogen chloride, dark alkanesulfonic acids having a strong, peculiar chlorine odor were produced. However, hydrogen chloride exerts a substantial bleaching effect on sulfonic acids such as the crude alkanesulfonic acids referred to above, if nitric acid is completely removed from the sulfonic acid before hydrogen chloride treatment is instituted. It will be understood that in place of hydrogen chloride (gas), I may employ concentrated hydrochloric acid, viz., having a concentration between about 30 and about 43 per cent, for example, about 39 per cent by weight.

Since the sulfonic acids are strong acids, they react readily with nitrates, e. g., $KNO_3$, $NaNO_3$, $NH_4NO_3$ and the like, to release nitric acid. Nitrates may, therefore, be employed in lieu of free nitric acid in the process of my invention, attended by the disadvantage of a corresponding increase in the ash content of the sulfonic acid.

I have applied by purification process to the treatment of a crude ethanesulfonic acid. This crude sulfonic acid was produced by oxidizing a synthetic diethyl disulfide, which in turn was produced by oxidizing ethanethiol with sulfur. The diethyl disulfide was oxidized at a temperature of about 110° F. under atmospheric pressure with a gas stream containing 3.5 volume percent NO₂, 44.3 volume percent oxygen and 52.2 volume percent nitrogen. About 44 cubic feet of oxidizing gas per hour were employed per cubic foot of liquid charging stock passing to the reactor. Oxidization was accomplished over a period of 100 hours, following which the resultant crude sulfonic acid was stripped with air for a period of 92 hours. A sample of the crude ethanesulfonic acid (107.8 grams) was weighed into a gas washing bottle, following which 1 cc. of concentrated nitric acid (100 percent concentration) was added. The bottle was then placed in a boiling water bath and air was blown through the crude sulfonic acid for three hours at about 212° F. to remove volatile impurities and excess nitric acid. The bottle was then removed from the water bath and, while still hot, hydrogen chloride gas was blown through the sulfonic acid at a slow rate for about 15 minutes. The bottle was then replaced in the water bath and air was blown through the sulfonic acid for three hours. The acid was then removed from the bottle and analyzed with the following results:

|  | Acid | |
| --- | --- | --- |
|  | Crude | Refined |
| Color | Pale orange | Pale orange. |
| Odor | Slight NO₂ | None. |
| Odor on dilution with water | Strong sulphoxide. | Faint sulphoxide. |
| Appearance on dilution | Turbid | Bright. |
| Chloride ion | None | None. |
| Per Cent H₂SO₄ | 5.17 | 5.19. |
| Acidity, per cent by weight | 105.5 | 104.5. |
| NO₂ test (FeSO₄) | Strong | None. |

Air blowing the crude sulfonic acid for 4 hours at 200–280° F. failed to remove more than a trace of NO₂.

The following tabulation describes the results obtained by treating alkanesulfonic acids with nitric acid having a concentration of 70 weight percent. In Runs 1, 2 and 3, the percentage of nitric acid based on the weight of crude sulfonic acid, which was used was 3.5, 4.0, and 8.5, respectively.

TABLE

*Treatment of sulfonic acids with nitric acid*

| Run | 1 | | 2 | | 3 | |
| --- | --- | --- | --- | --- | --- | --- |
| Acid | Ethanesulfonic | | Mixed [1] | | Mixed [1] | |
|  | Crude | Refined | Crude | Refined | Crude | Refined |
| Pounds Sulfonic Acid Treated | 252 |  | 322 |  | 353 |  |
| Sulfonic Acid Concentration, Wt. Per Cent | 83.1 | 83.5 | 94.1 | 91.0 | 91.9 | 92.75 |
| Sulfuric Acid, Wt. Per Cent | 4.45 | 4.7 | 3.4 | 3.7 | 5.14 | 5.48 |
| Water, Wt. Per Cent | 10.24 | 10.92 | 3.3 |  | 2.62 | 5.08 |
| Ash, Wt. Per Cent | 0.0012 | 0.01 | 0.0016 | 0.01 | 0.002 | 0.008 |
| Water Insol. Materials, Wt. Per Cent | 0.004 |  | 0.008 | 0.00 | 0.00 | 0.00 |
| Oxalic Acid, Wt. Per Cent | 0.102 |  | 0.084 | 0.114 | 0.167 | 0.166 |
| Mol. Wt. | 111.65 | 111.17 | 112 | 107.2 | 112.8 | 114 |
| Color, NPA | 2½–3 | 2–2½ | 2½–3 | 1½–2 | 4 | 2 |
| Color (After 3 hrs. at 210° F.), NPA | 3½–4 | 2 | 2 | 2 | 6–7 | 2 |

[1] A mixture of $C_1$–$C_4$ alkanesulfonic acids.

As the above tabulation clearly shows, the nitric acid treatment in every instance resulted in substantial color improvement of the crude sulfonic acids and also improved the color stability of the crude acids as indicated by the accelerated aging test (color determinations following heating of the sulfonic acids for three hours at 210° F.). The above data also indicate that the nitric acid treatment does not result in substantial increases in the water or sulfuric acid content of the sulfonic acids and that the refined sulfonic acids resulting from the nitric acid treatment have substantially the same strength as the crude acids. Although the odors of the sulfonic acids cannot be readily expressed numerically, it was nevertheless observed that the nitric acid treatment of the crude sulfonic acids substantially improved their odor.

Having thus described my invention, what I claim is:

1. A process for purifying a crude sulfonic acid containing impurities comprising nitrogen oxides and disulfoxides, said sulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, inclusive, which process comprises, in sequence, contacting said sulfonic acid with nitric acid in quantity sufficient to interact with a substantial proportion of said impurities, removing at least a portion of volatile impurities from the contacting mixture, contacting the sulfonic acid thus treated with hydrogen chloride, and removing volatile impurities from the resultant sulfonic acid.

2. A process for purifying a crude sulfonic acid containing impurities including nitrogen oxides and disulfoxides, said sulfonic acid being derived from a nitrogen oxide-catalyzed oxidation of an aliphatic sulfur compound selected from the group consisting of aliphatic mercaptans and compounds having the formula $R_1S_nR_2$ wherein $R_1$ and $R_2$ are aliphatic hydrocarbon radicals and $n$ is an integer having a value between 1 and 6, inclusive, which process comprises, in sequence, contacting said sulfonic acid with nitric acid in quantity sufficient at least to interact with a substantial proportion of said impurities, removing volatile impurities and excess nitric acid from the contacting mixture, contacting the sulfonic acid thus treated with hydrogen chloride, and removing volatile impurities from the resultant sulfonic acid.

3. The process of claim 1 wherein the crude sulfonic acid is an alkanesulfonic acid.

4. The process of claim 1 wherein the crude sulfonic acid is an alkanesulfonic acid containing between 1 and 5 carbon atoms, inclusive, in the molecule.

5. A process for purifying a crude alkanesulfonic acid of at least about 80 weight percent strength containing a nitrogen oxide impurity, said alkanesulfonic acid being derived from a nitrogen oxide-catalyzed oxidation of an aliphatic sulfur compound selected from the group consisting of alkyl mercaptans and compounds having the formula $R_1S_nR_2$ wherein $R_1$ and $R_2$ are alkyl radicals and $n$ is an integer having a value between 1 and 6, inclusive, which process comprises, in sequence, contacting said sulfonic acid with between about 1 and about 15 percent by weight of nitric acid having a concentration between about 60 and about 100 percent by weight and subsequently volatilizing impurities from the contacting mixture.

6. The process for purifying a crude alkanesulfonic acid of at least about 80 weight percent strength containing a nitrogen oxide impurity, said alkanesulfonic acid being derived from a nitrogen oxide-catalyzed oxidation of an aliphatic sulfur compound selected from the group consisting of alkyl mercaptans and compounds having the formula $R_1S_nR_2$ wherein $R_1$ and $R_2$ are alkyl radicals and $n$ is an integer having a value between 1 and 6, inclusive, which process comprises contacting said sulfonic acid with between about 1 and about 15 percent by weight of nitric acid having a concentration between about 60 and about 100 percent by weight, and thereafter removing volatile impurities from the contacting mixture by purging the same with an inert gas.

7. The process of claim 6 wherein the inert gas is air.

8. A process for purifying a crude alkanesulfonic acid containing a nitrogen oxide impurity, said alkanesulfonic acid being derived from a nitrogen oxide-catalyzed oxidation of an aliphatic sulfur compound selected from the group consisting of alkyl mercaptans and compounds having the formula $R_1S_nR_2$ wherein $R_1$ and $R_2$ are alkyl radicals and $n$ is an integer having a value between 1 and 6, inclusive, which process comprises contacting said sulfonic acid with between about 1 and about 15 percent of nitric acid having a concentration between about 60 and about 100 percent by weight, removing volatile impurities from the contacting mixture, thereafter contacting the sulfonic acid with hydrogen chloride and then removing hydrogen chloride from the contacting mixture.

9. A process for purifying a crude alkanesulfonic acid containing impurities including nitrogen oxides and disulfoxides, said alkanesulfonic acid being derived from a nitrogen oxide-catalyzed oxidation of an aliphatic sulfur compound selected from the group consisting of alkyl mercaptans and compounds having the formula $R_1S_nR_2$ wherein $R_1$ and $R_2$ are alkyl radicals and $n$ is an integer having a value between 1 and 6, inclusive, which process comprises contacting said sulfonic acid with between about 1 and about 15 percent by weight of nitric acid having a concentration between about 60 and about 100 percent by weight, purging the contacting mixture with an inert gas at a temperature between about 180° F. and about 280° F. for a period of time sufficient to remove at least a substantial proportion of volatile impurities, thereafter contacting the resultant sulfonic acid with hydrogen chloride, whereby the sulfonic acid is bleached, and removing hydrogen chloride from the sulfonic acid.

10. A process for purifying a crude alkanesulfonic acid containing not more than about 10 weight percent of water, said alkanesulfonic acid being derived from a nitrogen oxide-catalyzed oxidation of an aliphatic sulfur compound selected from the group consisting of alkyl mercaptans and compounds having the formula $R_1S_nR_2$ wherein $R_1$ and $R_2$ are alkyl radicals and $n$ is an integer having a value between 1 and 6, inclusive, which process comprises contacting said alkanesulfonic acid with added nitric acid in quantity sufficient substantially only to react with impurities therein contained, said quantity being between about 1 and about 15 percent by weight based on the weight of said alkanesulfonic acid, said nitric acid having a concentration between about 60 and about 100 percent by weight, and subsequently removing volatile impurities from the contacting mixture.

11. A process for purifying a crude alkanesulfonic acid of at least about 90 weight percent strength containing impurities including nitrogen oxides and disulfoxides, said alkanesulfonic acid being derived from a nitrogen oxide-catalyzed oxidation of an aliphatic sulfur compound selected from the group consisting of aliphatic mercaptans and compounds having the formula $R_1S_nR_2$ where $R_1$ and $R_2$ are aliphatic hydrocarbon radicals and $n$ is an integer having a value between 1 and 6, inclusive, which process comprises contacting said sulfonic acid with between about 1 and about 15 percent by weight of nitric acid having a concentration between about 60 and about 100 percent by weight, and subsequently volatilizing impurities from the contacting mixture.

12. A process for purifying a crude concentrated sulfonic acid of at least about 80 weight percent strength produced by a nitrogen oxide-catalyzed oxidation of an aliphatic sulfur compound selected from the group consisting of aliphatic mercaptan and compounds having the formula $R_1S_nR_2$ wherein $R_1$ and $R_2$ are aliphatic hydrocarbon radicals and $n$ is an integer having a value between 1 and 6, inclusive, which process comprises contacting said crude sulfonic acid with between about 1 and about 15 percent by weight of nitric acid having a concentration between about 60 and about 100 percent by weight at a temperature between about 0° F. and about 75° F. for a period of time sufficient to produce substantial interaction between said nitric acid and impurities contained in said crude sulfonic acid, and subsequently removing volatile impurities from the contacting mixture by blowing said mixture with an inert gas at a temperature between about 180° F. and about 280° F.

WAYNE A. PROELL.

REFERENCES CITED

The following references are of record in the file of this patent:

UNITED STATES PATENTS

| Number | Name | Date |
| --- | --- | --- |
| 522,028 | Price | June 26, 1894 |
| 2,125,189 | Lofton et al. | July 26, 1938 |
| 2,187,338 | Werntz | Jan. 16, 1940 |
| 2,217,874 | Merriam | Oct. 15, 1940 |
| 2,231,594 | Profft | Feb. 11, 1941 |
| 2,298,387 | Kenyon | Oct. 13, 1942 |
| 2,433,396 | Proell | Dec. 30, 1947 |
| 2,467,442 | Overhoff | Apr. 19, 1949 |
| 2,489,318 | Proell | Nov. 29, 1949 |

OTHER REFERENCES

Organic Chem. of Sulfur by Suter, page 97.